US007657661B2

(12) United States Patent
Ohnishi (10) Patent No.: US 7,657,661 B2
(45) Date of Patent: Feb. 2, 2010

(54) DATA OUTPUT APPARATUS AND CONTROL METHOD THEREFOR

(75) Inventor: Shinji Ohnishi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 293 days.

(21) Appl. No.: 11/065,248

(22) Filed: Feb. 24, 2005

(65) Prior Publication Data

US 2005/0193152 A1 Sep. 1, 2005

(30) Foreign Application Priority Data

Feb. 27, 2004 (JP) ............................. 2004-052938

(51) Int. Cl.
*G06F 3/00* (2006.01)
*G06F 13/12* (2006.01)
(52) U.S. Cl. ................................ 710/5; 710/65; 710/74
(58) Field of Classification Search ....................... 710/5
See application file for complete search history.

(56) References Cited

U.S. PATENT DOCUMENTS

| 5,640,198 | A  | * | 6/1997  | Makiyama et al. ....... 348/14.12 |
| 6,587,911 | B1 | * | 7/2003  | Kawamura et al. ........... 710/315 |
| 6,788,653 | B1 | * | 9/2004  | Sakamoto et al. ............ 370/282 |
| 2003/0123427 | A1 | * | 7/2003 | Gaedke et al. ............. 370/349 |
| 2004/0257488 | A1 | * | 12/2004 | Lee et al. ..................... 349/43 |

FOREIGN PATENT DOCUMENTS

| JP | 48-061012 A | 8/1973 |
| JP | 2000-307619 A | 11/2000 |
| JP | 2001-027064 A | 1/2001 |
| JP | 2001-275076 A | 10/2001 |

OTHER PUBLICATIONS

Hewlett Packard, et al. Universal Serial Bus Specification Revision 2.0, Apr. 27 2000.
IEC 61883-1: Consumer Audio/Video Equipment—Digital Interface—Part 1: General, First edition, 1998, pp. 1-83, Geneva, Switzerland.
IEC 61883-2: Consumer Audio/Video Equipment—Digital Interface—Part 2: SD-DVCR Data Transmission, First edition, 1998, pp. 1-17, Geneva, Switzerland.
IEC 61883-4: Consumer Audio/Video Equipment—Digital Interface—Part 4: MPEG-TS Data Transmission, First edition, 1998, pp. 1-23, Geneva, Switzerland.
Ta Document 2001012, AV/C Digital Interface Command Set General Specification 4.1, 2001, pp. 1-108, United States.

* cited by examiner

*Primary Examiner*—Alan Chen
(74) *Attorney, Agent, or Firm*—Canon U.S.A. Inc., I.P. Division (57) ABSTRACT

A data output apparatus includes a reproducing unit for reproducing data from a recording medium, and output means which outputs the data reproduced from the recording medium. If the data output apparatus received a first command, the data output apparatus sets the output means to a state locked to one format; if the data output apparatus received a second command, the data output apparatus sets the output means to a state not locked to one format; and if the data output apparatus received a third command, the data output apparatus sets the format of the output means to a format designated by the third command, irrespective of whether the output means is in the state locked to one format.

6 Claims, 8 Drawing Sheets

| | MSB | | | | | | LSB |
|---|---|---|---|---|---|---|---|
| OPCODE | OUTPUT PLUG SIGNAL FORMAT LOCK ||||||||
| OPERAND[0] | PLUG |||||||
| OPERAND[1] | LOCK |||||||

FIG. 5

| | MSB | | | | | | LSB |
|---|---|---|---|---|---|---|---|
| OPCODE | OUTPUT PLUG SIGNAL FORMAT LOCK ||||||||
| OPERAND[0] | PLUG |||||||
| OPERAND[1] | 0xFF |||||||

FIG. 6

| | MSB | | | | | | LSB |
|---|---|---|---|---|---|---|---|
| OPCODE | INPUT PLUG SIGNAL FORMAT LOCK ||||||||
| OPERAND[0] | PLUG |||||||
| OPERAND[1] | LOCK |||||||

FIG. 7

| | MSB | | | | | | LSB |
|---|---|---|---|---|---|---|---|
| OPCODE | INPUT PLUG SIGNAL FORMAT LOCK ||||||||
| OPERAND[0] | PLUG |||||||
| OPERAND[1] | 0xFF |||||||

| | | STATE OF PLUG | CURRENT FORMAT | NODE ID | EUI-64 |
|---|---|---|---|---|---|
| oPCR INFORMATION | oPCR[0] | LOCKED STATE | DV | 0x0000 | 0xAAAAAAAAAAAAAAAA |
| | oPCR[1] | UNLOCKED STATE | DV | --- | --- |
| | ... | ... | ... | ... | ... |
| | oPCR[30] | UNLOCKED STATE | DV | --- | --- |
| iPCR INFORMATION | iPCR[0] | LOCKED STATE | MPEG-2 | 0x0001 | 0xBBBBBBBBBBBBBBBB |
| | iPCR[1] | UNLOCKED STATE | DV | --- | --- |
| | ... | ... | ... | ... | ... |
| | iPCR[30] | UNLOCKED STATE | DV | --- | --- |

DATA OUTPUT APPARATUS AND CONTROL METHOD THEREFOR

FIELD OF THE INVENTION

The present invention relates to a data output apparatus having output means of outputting a plurality of kinds of stream data, and a method for controlling the same.

DESCRIPTION OF THE RELATED ART

Hitherto, recording and reproducing apparatuses having a function of recording a plurality of kinds of stream data on a magnetic tape, and a function of reproducing a plurality of kinds of stream data from a magnetic tape, have been proposed (see, for example, Japanese Patent Laid-Open No. 2001-275676). The Japanese Patent Laid-Open No. 2001-275076 has proposed a recording and reproducing apparatus that records standard definition (SD) video data or high definition (HD) video data on a magnetic tape. Here, the "SD video data" is video data conformable to the DV format laid down by the HD Digital VCR Conference, and the "HD video data" is video data conformable to the MPEG-2 format.

Also, regarding network interfaces of the recording and reproducing apparatus, there have been known IEEE 1394 standards (see (1) IEEE Std 1394-1995, IEEE standard for a high Performance Serial Bus, Institute of Electrical and Electronics Engineers, Inc.; and (2) IEEE Std 1394a-2000, IEEE standard for a High Performance Serial Bus—Amendment 1, Institute of Electrical and Electronics Engineers, Inc.), and USB standard (see Universal Serial Bus Specification Revision 2.0, Apr. 27, 2000). Either of the IEEE 1394 standards and USB standard is a standard regarding high-speed serial buses. In particular, the network interface conformable to the IEEE 1394 standards (hereinafter, this network interface is referred to as an IEEE 1394 interface) is capable of controlling inputs and outputs of stream data conformable to the DV format or MPEG-2 format (see (1) IEC 61883-1: Consumer Audio/Video Equipment—Digital Interface—Part 1: General; (2) IEC 61883-2: Consumer Audio/Video Equipment—Digital Interface—Part 2: SD-DVCR Data Transmission; and (3) IEC 61883-4: Consumer Audio/Video Equipment—Digital Interface—Part 4: MPEG-TS Data Transmission). Hereinafter, the stream data (including audio data and video data) conformable to the DV format is referred to as "DV data", while stream data (including audio data and video data) conformable to the MPEG-2 format is referred to as "MPEG-2 data".

The recording and reproducing apparatus having IEEE 1394 interfaces and conformable to IEC 61883-1, IEC 61883-2, and IEC 61883-4 would be able to continuously output DV data and MPEG-2 data to the outside through an oPGR (output plug control register) defined by the IEC 61883-1, as well as to continuously input DV data and MPEG-2 data from the outside through an iPCR (input plug control register) defined by the IEC 61883-1.

Some control apparatuses for remotely controlling the above-described recording and reproducing apparatus had better locked data format of stream data outputted from an oPCR of the recording and reproducing apparatus, to a predetermined data format. For example, when a control apparatus is in a state of being able to process DV data but unable to process MPEG-2 data, the data format of stream data outputted from an oPCR thereof had better be locked to the DV format.

However, at present, the command that requires changing the state of an oPCR into a locked state (state locked to any one of DV format, MPEG-2 format, and the like) is not clearly defined. Likewise, the command that requires changing the state of an oPCR into an unlocked state (state that is released from the locked state) is not clearly defined. It is therefore impossible to change the state of an oPCR into the locked state or unlocked state by the control apparatus. Furthermore, when a plurality of control apparatuses are provided, the command issued from which control apparatus is to be given priority, is not clearly defined, as well. Regarding these problems, the same goes for the command that requires locking the data format of stream data inputted to an iPCR, to a predetermined data format.

Furthermore, these problems are problems that can also occur in a recording and reproducing apparatus having output means (including not only a logical output terminal such as an oPCR but also a physical output terminal) corresponding to an oPCR defined by IEC 61883-1, and they are problems that can also occur in a recording and reproducing apparatus having input means (including not only a logical output terminal such as an oPCR but also a physical output terminal) corresponding to an iPCR defined by IEC 61883-1.

SUMMARY OF THE INVENTION

The present invention is directed to overcoming the above-described drawbacks. For example, the present invention is directed to enabling the output means (e.g., oPCR defined by the IEC 61883-1) or the input means (e.g., iPCR defined by the IEC 61883-1) to be set to a locked state (state locked to a predetermined data format) or an unlocked state (state of being released from the locked state) in accordance with a command from the control apparatus.

In an aspect of the present invention, a data output apparatus includes a reproducing unit for reproducing data from a recording medium, and output means which outputs the data reproduced from the recording medium, wherein, if the data output apparatus received a first command, the data output apparatus sets the output means to a state locked to one format; if the data output apparatus received a second command, the data output apparatus sets the output means to a state not locked to one format; and if the data output apparatus received a third command, the data output apparatus sets the format of the output means to a format designated by the third command, irrespective of whether the output means is in the state locked to one format.

In another aspect of the present invention, a data output apparatus includes a reproducing unit for reproducing data from a recording medium, and output means which outputs the data reproduced from the recording medium, wherein, if the data output apparatus received a first command, the data output apparatus sets the output means to a state locked to one format; if the data output apparatus received a second command, the data output apparatus sets the output means to a state not locked to one format; and if the data output apparatus received a third command, the data output apparatus determines whether the format of the output means is to be set to a format designated by the third command, based on a state of the output means and a state of the reproducing unit.

In still another aspect of the present invention, a method for controlling output means of a data output apparatus includes: a first step of transmitting, to the data output apparatus, a first command that requires setting the output means to a state locked to one format; a second step of transmitting, to the data output apparatus, a second command that designates the format of data outputted from the output means; and a third step of transmitting, to the data output apparatus, a third command that requires setting the output means to a state not locked to one format.

Other features and advantages of the invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

DESCRIPTION OF THE EMBODIMENTS

Embodiments of the invention will be described in detail below with reference to the drawings.

In the embodiments described below, the state locked to at least one data format is referred to as a "locked state", while the state of being released from the locked state (namely, the state not locked to any data format) is referred to as an "unlocked state". Also, in the embodiments described below, the state locked to the DV format is referred to as a "DV locked state", while the state locked to the MPEG-2 format is referred to as an "MPEG-2 locked state".

First Embodiment

Figure 1:
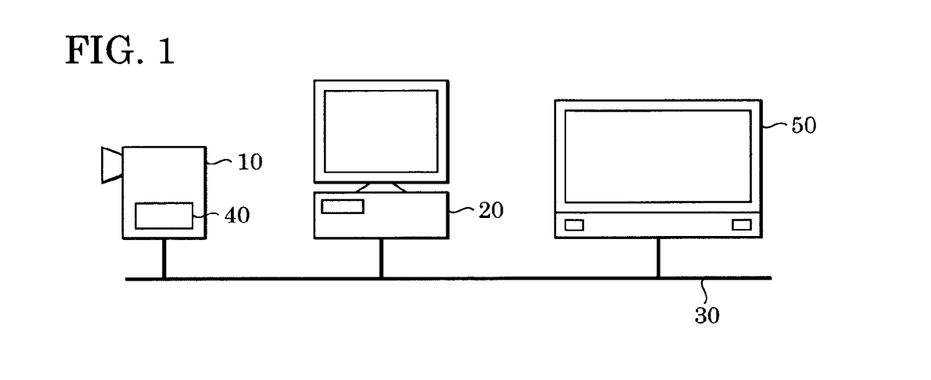
FIG. 1 is a schematic diagram of the main components of a control system according to a first embodiment of the present invention.

Firstly, the main components of a control system according to a first embodiment of the present invention will be described with reference to FIG. 1. FIG. 1 illustrates a recording and reproducing apparatus 10 having a function of inputting a plurality of kinds of stream data from the outside and recording them on a recording medium, and a function of reproducing a plurality of kinds of stream data from the recording medium and outputting them to the outside. In this embodiment, the case where the recording and reproducing apparatus 10 is an apparatus treating the DV data and MPEG-2 data, is taken as an example. Also, in this embodiment, the case where the DV data includes SD video data, and the MPEG-2 data includes HD video data having a higher resolution than the SD video data is described. Furthermore, in this embodiment, the case where the recording and reproducing apparatus 10 is a digital video camera (hereinafter, DVC) is described. However, the recording and reproducing apparatus 10 to be used in the present invention may be another apparatus, such as a digital camera, mobile phone with camera, or digital video recorder. Here, the recording and reproducing apparatus can be regarded as a data output apparatus for outputting stream data to the outside.

Also illustrated in FIG. 1 is a first control apparatus 20 which includes a recording medium that has recorded thereon control programs (including programs for controlling processing shown in FIGS. 9 and 12) for remotely controlling the recording and reproducing apparatus 10, and a control unit for executing the control programs. In this embodiment, the case where the first control apparatus 20 is a personal computer (hereinafter, PC) is described.

FIG. 1 also shows a second control apparatus 50 including a recording medium that has recorded thereon control programs (including programs for controlling processing described in FIGS. 9 and 12) for remotely controlling the recording and reproducing apparatus 10, and a control unit for executing the control programs. In this embodiment, the case where the second control apparatus 50 is a display device with a digital television tuner (hereinafter, this display device is referred to as a DTV) is described.

A transmission medium 30 connects the DVC 10, PC 20, and DTV 50. In this embodiment, the case where the transmission medium 30 is an IEEE 1394 serial bus is described. Here, the "IEEE 1394 serial bus" refers to a serial bus conformable to the above-described IEEE 1394 standards.

A recording medium 40 is attachable to the DVC 10. In this embodiment, the case where the recording medium 40 is a magnetic tape is described. However, the recording medium 40 to be used in the present invention may be another recording medium, such as a hard disk device, optical disk, magnetic disk, etc.

Each of the DVC 10, PC 20, and DTV 50 has the above-described IEEE 1394 interface, and is capable of communication through the IEEE 1394 serial bus 30.

Each of the PC 20, and DTV 50 operates as a controller for controlling the DVC 10 (target) by using the function control protocol (FCP) defined by the IEC 61883-1, and an AV/C command (see reference: TA Document 2001012, AV/C Digital Interface Command Set General Specification 4.1, Dec. 11, 2001).

Figure 2:
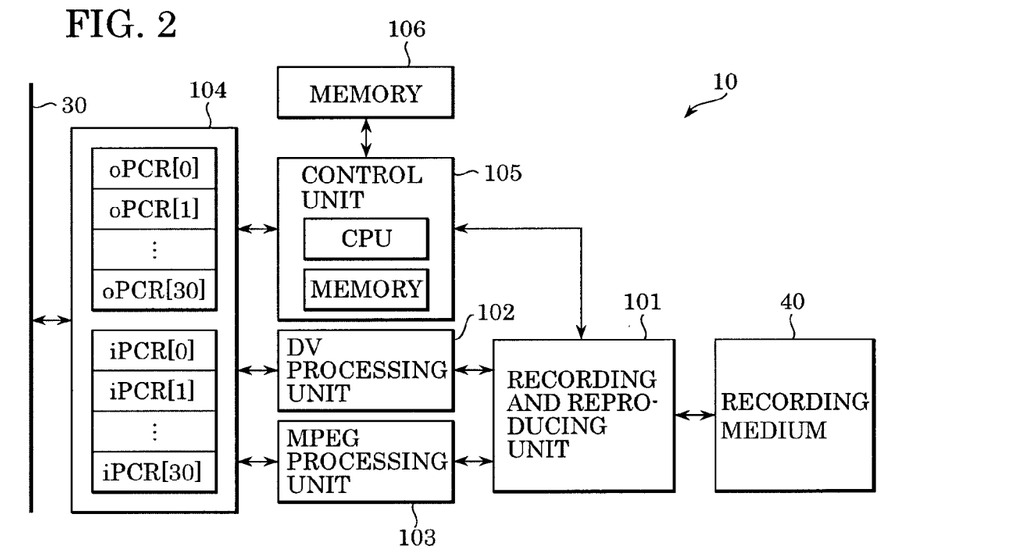
FIG. 2 is a block diagram of the main components of a recording and reproducing apparatus (e.g., DVC) according to the first embodiment of the present invention.

Next, the main components of the DVC 10 will be described with reference to FIG. 2. As shown in FIG. 2, the DVC 10 includes a recording and reproducing unit 101 having a function of reproducing stream data (DV data or MPEG-2 data) recorded on the recording medium 40, and a function of recording inputted stream data (DV data or MPEG-2 data) on the recording medium 40. A DV processing unit 102 processes DV data. An MPEG processing unit 103 processes MPEG-2 data. An IEEE 1394 interface unit 104 is capable of communicating with the PC 20 and DTV 50. The IEEE 1394 interface unit 104 has thirty-one oPCRs and thirty-one iPCRs. The oPCR is a logical output terminal defined by the IEC 61883-1, while the iPCR is a logical input terminal defined by the IEC 61883-1. A control unit 105 controls operations of the DVC 10, and includes a central processing unit (CPU), and a memory that has stored therein programs (including programs for controlling processing shown in FIGS. 8, 10, and 11) to be executed by the CPU.

Figure 13:
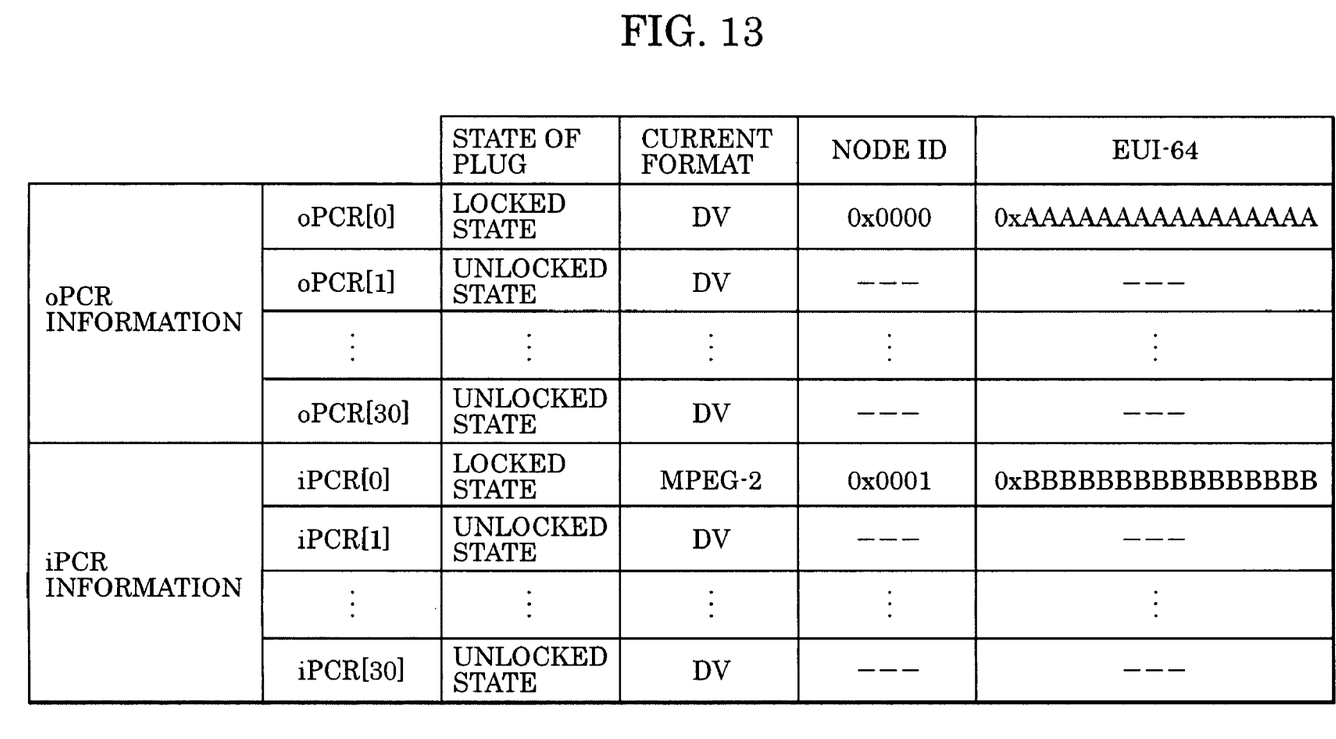
FIG. 13 is a representation of an example of the construction of a plug management table.

A memory 106 stores the plug management table. The plug management table is a management table for registering information about all oPCRs and iPCRs. Hereinafter, information about the state of an oPCR is referred to as "oPCR information", while information about the state of an iPCR is referred to as "iPCR information". FIG. 13 shows an example of a plug management table.

The "state of plug" column shown in FIG. 13 is a column where data showing states of oPCRs and iPCRs (i.e., locked state or unlocked state) are registered. The control unit 105 changes the state of an oPCR or iPCR into the locked state or unlocked state, in accordance with an OUTPUT PLUG SIGNAL FORMAT LOCK command or INPUT PLUG SIGNAL FORMAT LOCK command from the controller (the PC 20 or DTV 50).

The "current format" column shown in FIG. 13 is a column where data showing formats to which oPCRs and iPCRs are set, is registered. In this embodiment, the format to which an oPCR and iPCR is set, referred to as a "current format". When MPEG-2 data is reproduced from the recording medium 40, the control unit 105 changes current formats of an oPCR and iPCR in the unlocked state, into the MPEG-2 format. On the other hand, when DV data is reproduced from the recording medium 40, the control unit 105 changes current formats of an oPCR and iPCR in the unlocked state, into the DV format. Also, the control unit 105 changes the current format of oPCR or iPCR in accordance with an OUTPUT PLUG SIGNAL FORMAT command or INPUT PLUG SIGNAL FORMAT command.

The "node ID" column shown in FIG. 13 is a column where data pieces each showing a node ID (corresponding to a network address) of the controller that has set an oPCR or iPCR to the locked state, are registered. Here, the node ID can be acquired from an asynchronous packet in which an OUTPUT PLUG SIGNAL FORMAT LOCK command or INPUT PLUG SIGNAL FORMAT LOCK command has been transmitted.

The "EUI-64" column shown in FIG. 13 is a column where data pieces each showing EUI-64, which is an ID intrinsic to the controller that has set an oPCR or iPCR to the locked state, are registered. When a bus reset defined by the above-described IEEE 1394 standards occurs, the above-described node ID might undesirably be changed into another node. In contrast, the EUI-64 is non-changing. Accordingly, each time a bus reset occurs, the control unit 105 detects node IDs corresponding to all EUI-64s registered in the plug management table, and reregisters the detected node IDs in the plug management table. At this time, the control unit 105 deletes EUI-64s whose node IDs could not be detected, from the plug management table, and also changes the state of an oPCR or iPCR corresponding to the pertinent EUI-64, into the unlocked state. This processing allows the control unit 105 to appropriately manage the oPCR and iPCR even after the bus reset has occurred. Here, the bus reset includes processing for initializing the network configuration, and processing for automatically imparting a node ID to each node in the network.

Upon turning-on of a powering switch of the DVC 10, the control unit 105 sets the plug states of all oPCRs and iPCRs to the unlocked state, and sets current formats of all oPCRs and iPCRs to the DV format (or MPEG-2 format). Here, the initial value of a current format can also be changed by a user. When an oPCR or iPCR is not employed for a specified time after the oPCR or iPCR has been set to the locked state, the control unit 105 sets the oPCR or iPCR to the unlocked state.

When transmitting DV data reproduced from the recording medium 40 to the PC 20 or DTV 50, the DVC 10 transmits the DV data to the PC 20 or DTV 50 through the DV processing unit 102 and at least one oPCR. On the other hand, when transmitting MPEG-2 data reproduced from the recording medium 40 to the PC 20 or DTV 50, the DVC 10 transmits the MPEG-2 data to the PC 20 or DTV 50 through the MPEG processing unit 103 and at least one oPCR.

When recording DV data transmitted from the PC 20 or DTV 50 on the recording medium 40, the DVC 10 records the DV data on the recording medium 40 through at least one iPCR and the DV processing unit 102. On the other hand, when recording MPEG data transmitted from the PC 20 or DTV 50 on the recording medium 40, the DVC 10 records the DV data on the recording medium 40 through at least one iPCR and the MPEG processing unit 103.

Figure 3:
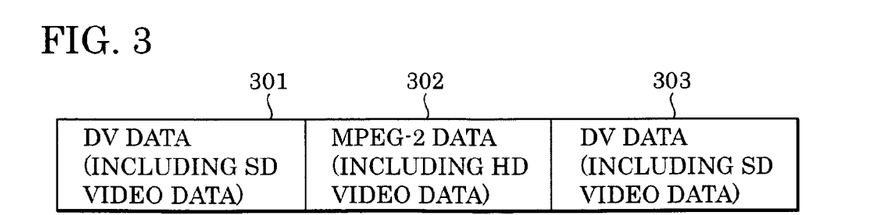
FIG. 3 is a representation of an example of a plurality of stream data recorded on a recording medium (e.g., magnetic tape).

Next, an example of a plurality of stream data recorded on the recording medium 40 will be described with reference to FIG. 3. As shown in FIG. 3, stream data conformable to a plurality of data formats is recorded on the recording medium 40.

FIG. 3 illustrates stream data (including audio and video data) conformable to the DV format 301 and 303, as in the case of the above-described DV data. FIG. 3 also illustrates stream data (including audio and video data) conformable to the MPEG-2 format 302, as in the case of the above-described MPEG-2 data. In this embodiment, it is assumed that the DV data includes SD video data, and the MPEG-2 data includes HD video data having a higher resolution (number of pixels) than the SD video data.

Next, the constructions of the OUTPUT PLUG SIGNAL FORMAT LOCK control command, OUTPUT PLUG SIGNAL FORMAT LOCK status command, INPUT PLUG SIGNAL FORMAT LOCK control command, and INPUT PLUG SIGNAL FORMAT LOCK status command that are used in this embodiment, will be explained with reference to FIGS. 4 to 7. Each of these commands is a command that is conformable to AV/C command (see reference: TA Document 2001012, AV/C Digital Interface Command Set General Specification 4.1, Dec. 11, 2001), and that is transmitted from the controller (the PC 20 or DTV 50) to the target (DCV 10) by the FCP defined by the IEC 61883-1. Also, each of these commands is not a command defined by the above-described "TA Document 2001012, AV/C Digital Interface Command Set General Specification 4.1, Dec. 11, 2001", but a command defined in this embodiment.

Figure 4:
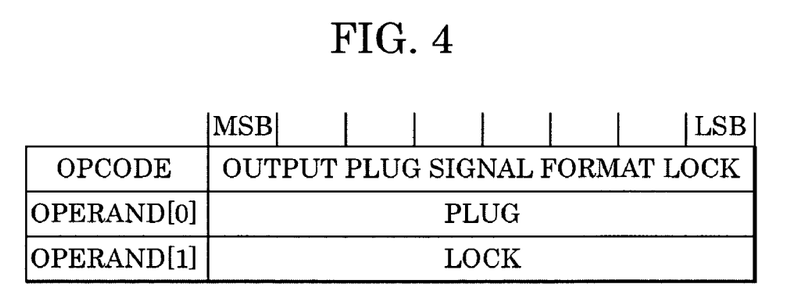
FIG. 4 is a representation of the construction of an OUTPUT PLUG SIGNAL FORMAT LOCK control command.

FIG. 4 is a representation of the construction of an OUTPUT PLUG SIGNAL FORMAT LOCK control command used in this embodiment. The OUTPUT PLUG SIGNAL FORMAT LOCK control command is a command that requires setting the states of one or all oPCRs to the locked state or unlocked state. In this embodiment, the OUTPUT PLUG SIGNAL FORMAT LOCK control command that requires setting the states of one or all oPCRs to the locked state is referred to as an "output lock command". On the other hand, the OUTPUT PLUG SIGNAL FORMAT LOCK control command that requires setting the states of one or all oPCRs to the unlocked state, is referred to as an "output unlock command".

In FIG. 4, a PLUG field (8 bits) is a field for storing a value indicating the plug number of an oPCR. When the oPCR of No. 0 is designated, 0x00 is stored in the PLUG field. When all oPCRs are designated, 0xFF is stored in the PLUG field. A LOCK field (8 bits) is a field for storing a value indicating that an OUTPUT PLUG SIGNAL FORMAT LOCK control command is either the output lock command or the output unlock command. When the OUTPUT PLUG SIGNAL FORMAT LOCK control command is an output lock command, 0x70 is stored in the LOCK field. On the other hand, when the OUTPUT PLUG SIGNAL FORMAT LOCK control command is an output unlock command, 0x60 is stored in the LOCK field.

Figure 5:
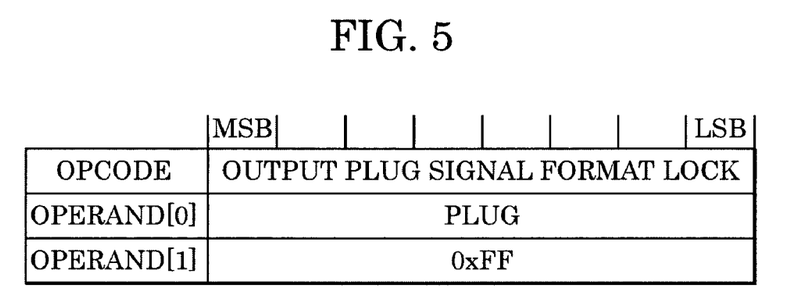
FIG. 5 is a representation of the construction of an OUTPUT PLUG SIGNAL FORMAT LOCK status command.

FIG. 5 is a representation of the construction of an OUTPUT PLUG SIGNAL FORMAT LOCK status command used in this embodiment. The OUTPUT PLUG SIGNAL FORMAT LOCK status command is a command inquiring the states of one or all oPCRs.

In FIG. 5, a PLUG field (8 bits) is a field for storing a value indicating the plug number of an oPCR. When the oPCR of No. 0 is designated, 0x00 is stored in the PLUG field. When all oPCRs are designated, 0xFF is stored in the PLUG field.

Figure 6:
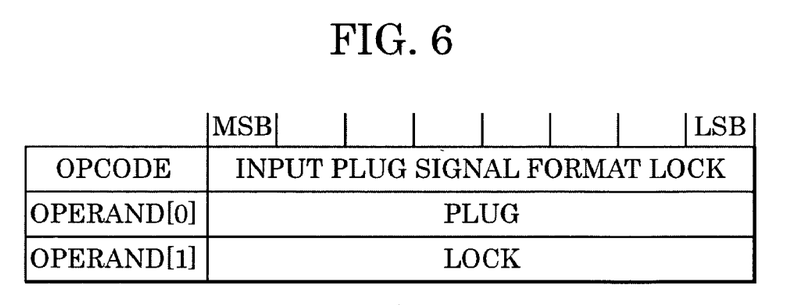
FIG. 6 is a representation of the construction of an INPUT PLUG SIGNAL FORMAT LOCK control command.

FIG. 6 is a representation of the construction of an INPUT PLUG SIGNAL FORMAT LOCK control command used in this embodiment. The INPUT PLUG SIGNAL FORMAT LOCK control command is a command that requires setting the states of one or all iPCRs to the locked state or unlocked state. In this embodiment, the INPUT PLUG SIGNAL FORMAT LOCK control command that requires setting the states of one or all iPCRs to the locked state is referred to as an "input lock command". On the other hand, the INPUT PLUG SIGNAL FORMAT LOCK control command that requires setting the states of one or all iPCRs to the unlocked state, is referred to as an "input unlock command".

In FIG. 6, a PLUG field (8 bits) is a field for storing a value indicating the plug number of an iPCR. When the iPCR of No. 0 is designated, 0x00 is stored in the PLUG field. When all iPCRs are designated, 0xFF is stored in the PLUG field. A LOCK field (8 bits) is a field for storing a value indicating that the INPUT PLUG SIGNAL FORMAT LOCK control command is either one of the output lock command and output unlock command. When the INPUT PLUG SIGNAL FORMAT LOCK control command is an output lock command, 0x70 is stored in the LOCK field. On the other hand, when the INPUT PLUG SIGNAL FORMAT LOCK control command is an output unlock command, 0x60 is stored in the LOCK field.

Figure 7:
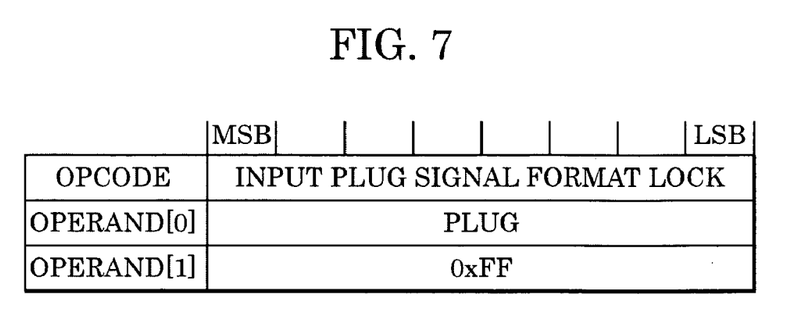
FIG. 7 is a representation of the construction of an INPUT PLUG SIGNAL FORMAT LOCK status command.

FIG. 7 is a representation of the construction of an INPUT PLUG SIGNAL FORMAT LOCK status command used in this embodiment. The INPUT PLUG SIGNAL FORMAT LOCK status command is a command inquiring the states of one or all iPCRs.

In FIG. 7, a PLUG field (8 bits) is a field for storing a value indicating the plug number of an iPCR. When the iPCR of No. 0 is designated, 0x00 is stored in the PLUG field. When all iPCRs are designated, 0xFF is stored in the PLUG field.

Now, processing to be executed in the DVC 10 will be described with reference to a flowchart shown in FIG. 8. This processing is one executed by the control unit 105 in accordance with a control program.

In step S801, the control unit 105 determines whether the power switch is in an on-state. If so, the process advances to S802.

In step S802, the control unit 105 sets all oPCRs to the unlocked state, and sets the current formats of all oPCRs to the DV format (or MPEG-2 format).

In step S803, the control unit 105 determines whether it has received a command transmitted from the controller (the PC 20 or DTV 50). If so, the process advances to step S804. Otherwise, the process advances to step S814.

In step S804, the control unit 105 determines whether the command transmitted from the controller (the PC 20 or DTV 50) is an OUTPUT PLUG SIGNAL FORMAT (OPSF) status command. If so, the process advances to step S805. Otherwise, the process advances to step S806. Here, the OUTPUT PLUG SIGNAL FORMAT status command is a command defined by "TA Document 2001012, AV/C Digital Interface Command Set General Specification 4.1, Dec. 11, 2001".

In step S805, the control unit 105 returns, to the controller, a response including data showing the current format of an oPCR defined by the OUTPUT PLUG SIGNAL FORMAT status command. Processing then proceeds from step S805 to step S814.

In step S806, the control unit 105 determines whether the command transmitted from the controller (the PC 20 or DTV 50) is an OUTPUT PLUG SIGNAL FORMAT (OPSF) control command. If so, the process advances to step S807. Otherwise, the process advances to step S808. Here, the OUTPUT PLUG SIGNAL FORMAT control command is a command defined by "TA Document 2001012, AV/C Digital Interface Command Set General Specification 4.1, Dec. 11, 2001".

In step S807, irrespective of whether an oPCR defined by the OUTPUT PLUG SIGNAL FORMAT control command is in the locked state, the control unit 105 changes the current format of the pertinent oPCR into a format designated by the command. This processing is processing that is executed even when an oPCR defined by the OUTPUT PLUG SIGNAL FORMAT control command is an oPCR set to the unlocked state, and the format of a stream data reproduced from the recording medium 40 is different from the format designated by the command. Also, the control unit 105 returns, to the controller, an "accepted" response indicating that the OUTPUT PLUG SIGNAL FORMAT control command has been properly accepted by the control unit 105. Processing then proceeds from step S807 to step S814.

In step S808, the control unit 105 determines whether a command transmitted from the controller (the PC 20 or DTV 50) is an OUTPUT PLUG SIGNAL FORMAT LOCK (OPSFL) status command. If so, the process advances to step S809. Otherwise, the process advances to step S810.

In step S809, the control unit 105 returns, to the controller, a response including data showing whether the oPCR defined by the OUTPUT PLUG SIGNAL FORMAT LOCK status command is in the locked state.

In step S810, the control unit 105 determines whether a command transmitted from the controller (the PC 20 or DTV 50) is an OUTPUT PLUG SIGNAL FORMAT LOCK (OPSFL) control command. If so, the process advances to step S811. If not, the process advances to step S814.

In step S811, the control unit 105 determines whether the OUTPUT PLUG SIGNAL FORMAT LOCK control command is an output lock command. If the control unit 105 determines that the OUTPUT PLUG SIGNAL FORMAT LOCK control command is an output lock command, the process advances to step S813. On the other hand, if the control unit 105 determines that the OUTPUT PLUG SIGNAL FORMAT LOCK control command is an output unlock command, the process advances to step S812.

In step S812, the control unit 105 sets an oPCR defined by the OUTPUT PLUG SIGNAL FORMAT LOCK control command to the unlocked state. Also, the control unit 105 returns, to the controller, an "accepted" response indicating that the OUTPUT PLUG SIGNAL FORMAT LOCK control command has been properly accepted by the control unit 105. At this time, the control unit 105 registers the node ID and EUI-64 of the controller that has transmitted the OUTPUT PLUG SIGNAL FORMAT LOCK control command, on the plug management table. Processing then proceeds from step S812 to step S814.

In step S813, the control unit 105 sets the oPCR defined by the OUTPUT PLUG SIGNAL FORMAT LOCK control command to the locked state. Also, the control unit 105 returns, to the controller, an "accepted" response indicating that the OUTPUT PLUG SIGNAL FORMAT LOCK control command has been properly accepted by the control unit 105. At this time, the control unit 105 registers the node ID and EUI-64 of the controller that has transmitted the OUTPUT PLUG SIGNAL FORMAT LOCK control command, on the plug management table. Processing then proceeds from step S813 to step S814.

In step S814, the control unit 105 determines whether the DVC 10 is in a state of being reproducing stream data from the recording medium 40, that is, in a reproducing state. If so, the process advances to step S815. If not, processing returns to step S803.

In step S815, the control unit 105 determines the type of a format of the stream data in the process of being reproduced from the recording medium 40. If the format type is determined as the DV format, the process advances to step S816. On the other hand, if the format type is determined as the MPEG-2 format, the process advances to step S817.

In step S816, the control unit 105 changes the current formats of all oPCRs set to the unlocked state, into the DV format. At this time, the control unit 105 does not change a current format of any oPCR set to the locked state. Processing then returns to step S803.

In step S817, the control unit 105 changes the current formats of all oPCRs set to the unlocked state, into the MPEG-2 format. At this time, the control unit 105 does not change a current format of any oPCR set to the locked state. Processing then returns to step S803.

In this manner, according to this embodiment, based on an OUTPUT PLUG SIGNAL FORMAT LOCK control command transmitted from the controller (the PC 20 or DTV 50), the control unit 105 can set an oPCR designated by the command to the locked state or unlocked state.

Also, according to this embodiment, irrespective of whether an oPCR defined by an OUTPUT PLUG SIGNAL FORMAT control command transmitted from the controller (the PC 20 or DTV 50) is in the locked state, the control unit 105 can set the format of the oPCR designated by the command, to the DV format or MPEG-2 format.

Next, an example of processing to be executed by the controller (the PC 20 or DTV 50) will be described with reference to a flowchart shown in FIG. 9. This processing is performed in accordance with a predetermined control program.

In step S901, the controller determines whether a reproduction request (PLAY request) from the user has been accepted. If so, the process advances to step S902. If not, the process ends.

In step S902, the controller determines whether the DVC 10 is connected to the IEEE 1394 serial bus 30. If so, the process advances to step S903. If not, the process ends.

In step S903, the controller selects a desired oPCR. In FIG. 9, for the sake of simplicity, the case where an oPCR [0] (the oPCR of No. 0) is selected, is explained.

In step S904, the controller produces the OUTPUT PLUG SIGNAL FORMAT LOCK control command (LOCK) that requires setting the oPCR [0] to the locked state, and transmits this command to the DVC 10. The OUTPUT PLUG SIGNAL FORMAT LOCK control command (LOCK) is transferred from the controller to the DVC 10 through the IEEE 1394 serial bus 30 in an asynchronous transfer mode. Upon receipt of the OUTPUT PLUG SIGNAL FORMAT LOCK control command (LOCK), the DVC 10 sets the oPCR [0] to the locked state.

In step S905, the controller determines whether a response to the OUTPUT PLUG SIGNAL FORMAT LOCK control command (LOCK) is an "accepted" response. The DVC 10 having properly accepted the OUTPUT PLUG SIGNAL FORMAT LOCK control command (LOCK) transmits the "accepted" response to the controller. If the controller determines that it has received the "accepted" response from the DVC 10, the process advances to step S906. If not, the process ends.

In step S906, the controller selects the DV format or MPEG-2 format. When executing a driver for DV format, the controller selects the DV format, and when executing a driver for MPEG-2 format, the controller selects the MPEG-2 format. When the DV format has been selected, the process advances to step S907, and when the MPEG-2 format has been selected, the process advances to step S909.

In step S907, the controller produces the OUTPUT PLUG SIGNAL FORMAT control command (DV) that requires setting the current format of the oPCR [0] to the DV format, and transmits this command to the DVC 10. The OUTPUT PLUG SIGNAL FORMAT control command (DV) is transferred from the controller to the DVC 10 through the IEEE 1394 serial bus 30 in an asynchronous transfer mode.

In step S908, the controller determines whether a response to the OUTPUT PLUG SIGNAL FORMAT control command (DV) is an "accepted" response. The DVC 10 having properly accepted the OUTPUT PLUG SIGNAL FORMAT control command (DV) transmits the "accepted" response to the controller. If the controller determines that it has received the "accepted" response from the DVC 10, the process advances to step S911. If not, the process ends.

In step S909, the controller produces the OUTPUT PLUG SIGNAL FORMAT control command (MPEG-2) that requires setting the current format of the oPCR [0] to the MPEG-2 format, and transmits this command to the DVC 10. The OUTPUT PLUG SIGNAL FORMAT control command (MPEG-2) is transferred from the controller to the DVC 10 through the IEEE 1394 serial bus 30 in an asynchronous transfer mode.

In step S910, the controller determines whether the response to the OUTPUT PLUG SIGNAL FORMAT control command (MPEG-2) is an "accepted" response. When the DVC 10 having properly accepted the OUTPUT PLUG SIGNAL FORMAT control command (MPEG-2), it transmits the "accepted" response to the controller. If the controller determines that it has received the "accepted" response from the DVC 10, the process advances to step S911. If not, the process ends.

In step S911, the controller produces a PLAY control command, and transmits this command to the DVC 10. The PLAY control command is transferred from the controller to the DVC 10 through the IEEE 1394 serial bus 30 in an asynchronous transfer mode. The DVC 10 having properly accepted the PLAY control command sets its own operating state to a reproducing state, and starts processing for reproducing stream data from the recording medium 40. Also, the DVC 10 outputs the stream data reproduced from the recording medium 40, from the oPCR [0]. At this time, if stream data that does not conform to the current format of the oPCR [0] is reproduced from the recording medium 40, the DVC 10 controls this stream data not to be outputted from the oPCR [0]. For example, the DVC 10 outputs only a CIP header corresponding to the current format of the oPCR [0], instead of the stream data. Alternatively, the DVC 10 outputs a blue back data corresponding to the current format of the oPCR [0], instead of the stream data.

In step S912, the controller inputs the stream data outputted from the oPCR [0], and displays this stream data.

In step S913, the controller determines whether a reproduction stop request (STOP request) from the user has been accepted. If so, the process advances to step S914. If not, the process ends.

In step S914, the controller produces the OUTPUT PLUG SIGNAL FORMAT LOCK control command (UNLOCK) that requires setting the oPCR [0] to the unlocked state, and transmits this command to the DVC 10. The OUTPUT PLUG SIGNAL FORMAT LOCK control command (UNLOCK) is transferred from the controller to the DVC 10 through the IEEE 1394 serial bus 30 in an asynchronous transfer mode. Upon receipt of the OUTPUT PLUG SIGNAL FORMAT LOCK control command (UNLOCK), the DVC 10 sets the oPCR [0] to the unlocked state.

In this way, according to this embodiment, a desired oPCR can be set to the DV locked state or MPEG locked state before putting the DVC 10 into the reproducing state (PLAY state), and the desired oPCR can be set to the unlocked state after having put the DVC 10 into the reproduction stop state (STOP state), thus providing convenience to the user.

Figure 9:
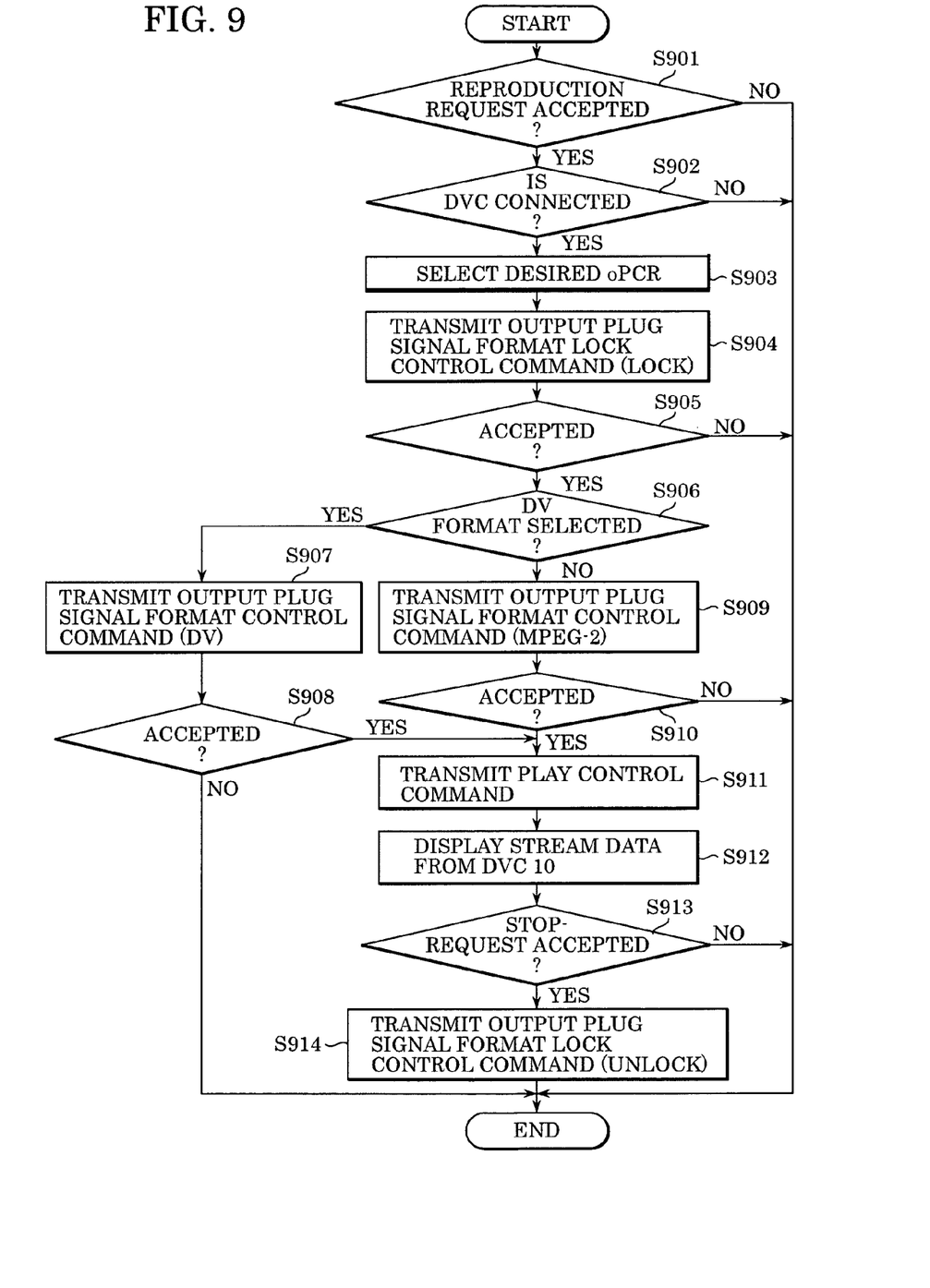
FIG. 9 is a flowchart showing processing performed in a control apparatus according to the first embodiment.

To the processing shown in FIG. 9, processing for transmitting an OUTPUT PLUG SIGNAL FORMAT status command to the DVC 10 can also be added before transmitting the OUTPUT PLUG SIGNAL FORMAT control command to the DVC 10. The OUTPUT PLUG SIGNAL FORMAT status command is a command for inquiring the current format of an oPCR defined by this command. When this processing is added, the controller (the PC 20 or DTV 50) can know the current format of a desired oPCR in advance. Furthermore, when the current format of the desired oPCR and a format defined by the OUTPUT PLUG SIGNAL FORMAT control command conform to each other, it is also possible to prevent the OUTPUT PLUG SIGNAL FORMAT control command from being transmitted to the DVC 10.

Figure 8:
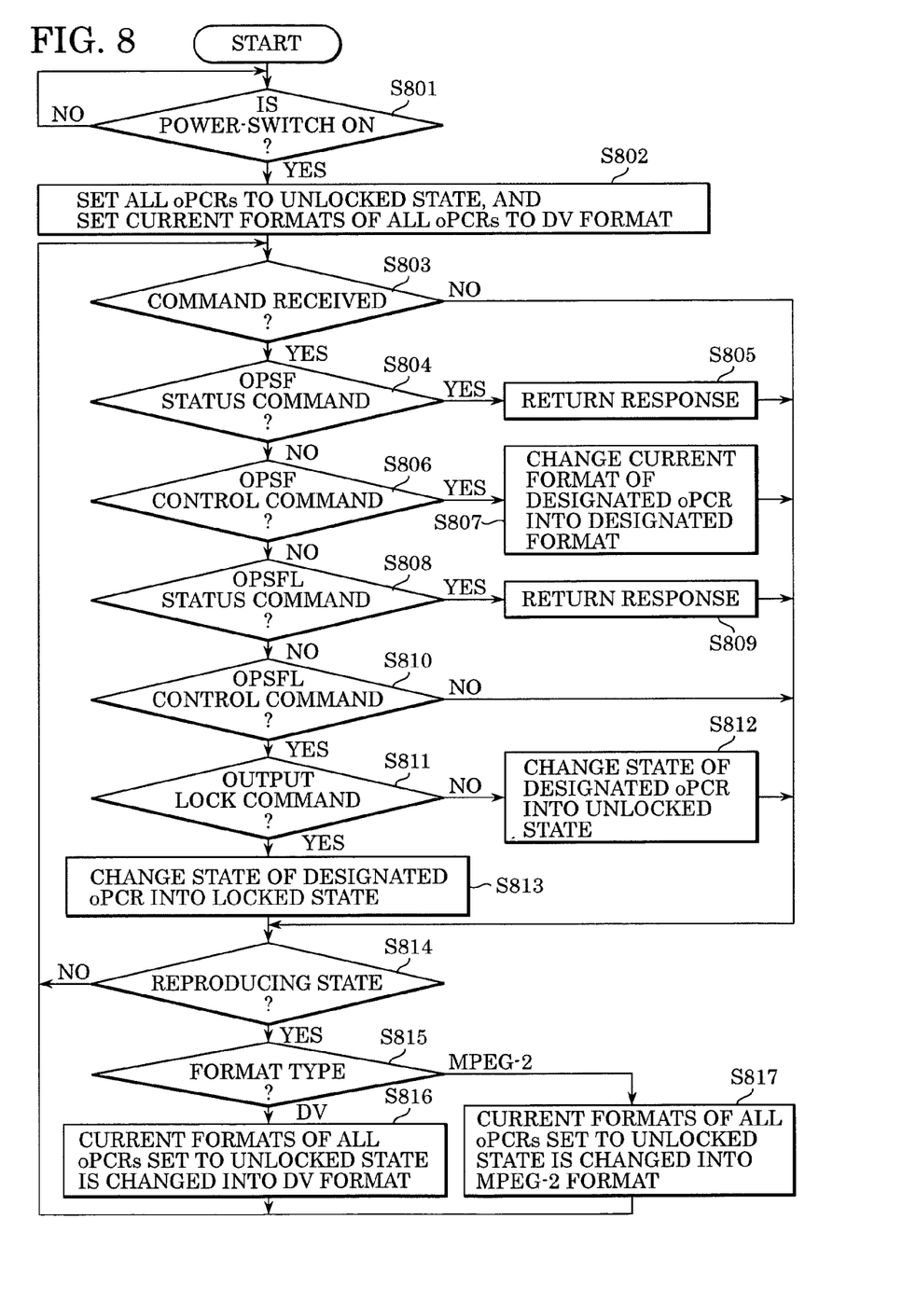
FIG. 8 is a flowchart showing processing performed in the recording and reproducing unit according to the first embodiment.

In the processing shown in FIGS. 8 and 9, the oPCR can also be replaced with the iPCR. For this purpose, each of the OUTPUT PLUG SIGNAL FORMAT status command, OUTPUT PLUG SIGNAL FORMAT control command, OUTPUT PLUG SIGNAL FORMAT LOCK status command, and OUTPUT PLUG SIGNAL FORMAT LOCK control command, has only to be replaced with a respective one of the INPUT PLUG SIGNAL FORMAT status command, INPUT PLUG SIGNAL FORMAT control command, INPUT PLUG SIGNAL FORMAT LOCK status command, and INPUT PLUG SIGNAL FORMAT LOCK control command. Here, the INPUT PLUG SIGNAL FORMAT status command and INPUT PLUG SIGNAL FORMAT control command are each a command defined by the "TA Document 2001012, AV/C Digital Interface Command Set General Specification 4.1, Dec. 11, 2001".

Second Embodiment

In the above-described first embodiment, description was made of the DVC 10 that, upon receipt of an OUTPUT PLUG SIGNAL FORMAT control command, performs processing for changing the current format of an oPCR defined by this command into a format designated by this command, irrespective of whether the oPCR is in the unlocked state (see step S807).

In contrast, in a second embodiment of the present invention, descriptions will be provided of the DVC 10 that performs processing for appropriately setting the current format of an oPCR designated by an OUTPUT PLUG SIGNAL FORMAT control command, in accordance with a state of the designated oPCR and an operating state of the DVC 10. In the second embodiment, the same portions as those in the first embodiment are omitted from description, and only portions different from those in the first embodiment are described.

First, processing to be executed in the DVC 10 will be described with reference to the flowchart shown in FIG. 10. This processing is one executed by the control unit 105 in accordance with a predetermined control program.

Because the processing of steps S801 to 806, and the processing of steps 808 to S817 are the same as those in the first embodiment, descriptions of them are not repeated here. However, in step 806, if the received command is determined as an OUTPUT PLUG SIGNAL FORMAT control command, the process advances not to step S807, but to step S1001.

In step S1001, the control unit 105 changes the current format of an oPCR designated by an OUTPUT PLUG SIGNAL FORMAT control command from the controller (the PC 20 or DTV 50), in accordance with a state of the designated oPCR and an operating state of the DVC 10. The specific contents of the processing performed in step S1001 are explained below with reference to FIG. 11.

Figure 11:
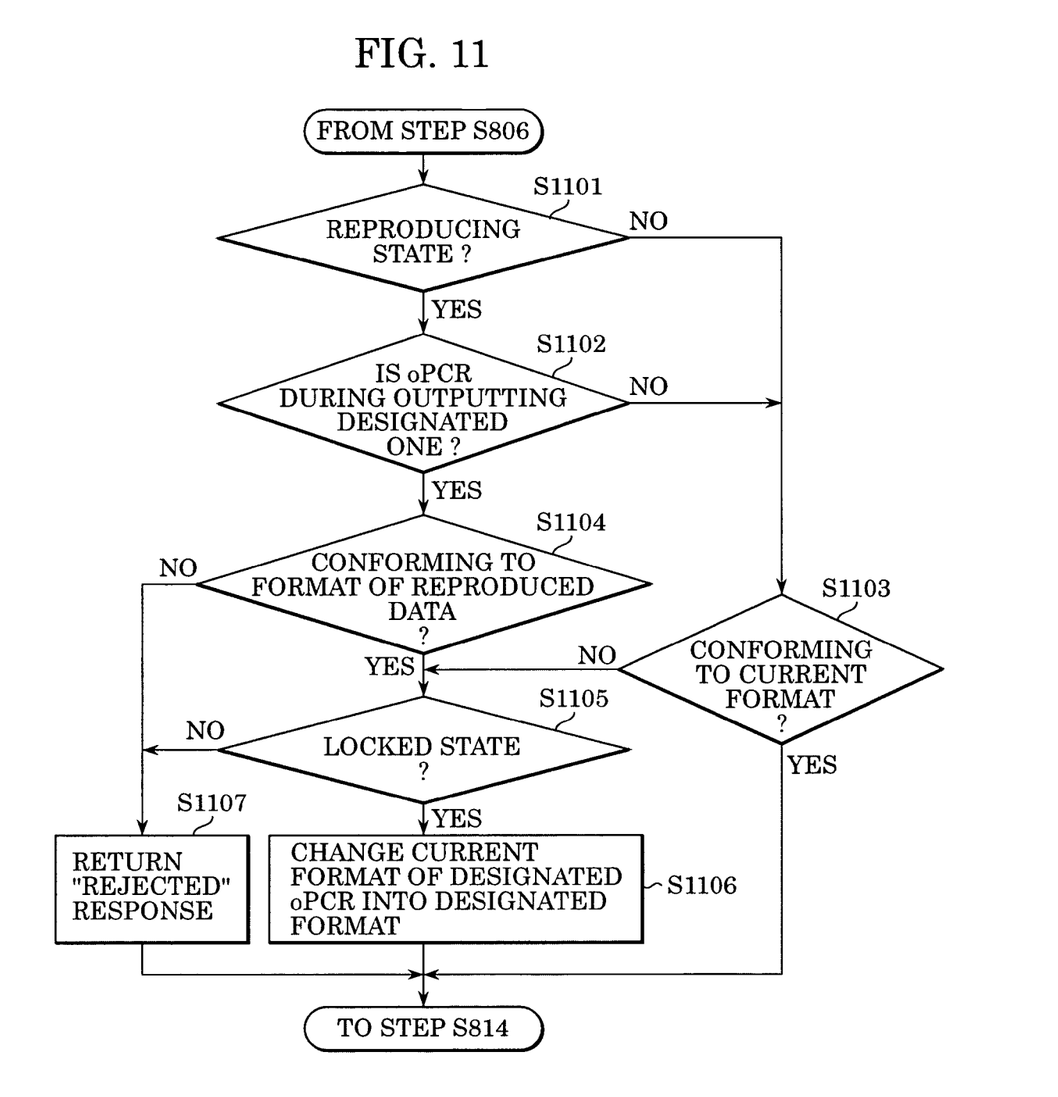
FIG. 11 is a flowchart showing the changing processing of a current format, performed in Step S1001.

Current format changing processing performed in step S1001 is described with reference to a flowchart shown in FIG. 11. This processing is also processing controlled by the control unit 105 in accordance with a predetermined control program. In FIG. 11, the oPCR designated by an OUTPUT PLUG SIGNAL FORMAT control command is referred to as a "designated oPCR", and the format designated by this command is referred to as a "designated format".

In step S1101, the control unit 105 determines whether the DVC 10 is in a state of being reproducing stream data from the recording medium 40, that is, in the reproducing state. If so, the process advances to step S1102. Otherwise, the process advances to step S1103.

In step S1102, the control unit 105 determines whether the number of a designated oPCR and the number of the oPCR in the process of outputting stream data reproduced from the recording medium 40 conform to each other. If the two numbers conform to each other, the process advances to step S1104. Otherwise, the process advances to step S1103.

In step S1103, the control unit 105 determines whether the current format of the designated oPCR and the current format designated by the OUTPUT PLUG SIGNAL FORMAT control command conform to each other. If the two numbers conform to each other, the process advances to step S814. Otherwise, the process advances to step S1105.

In step S1104, the control unit 105 determines whether the current format of the designated oPCR and the format of stream data reproduced from the recording medium 40 conform to each other. If the two numbers conform to each other, the process advances to step S1105. Otherwise, the process advances to step S1107.

In step S1105, the control unit 105 determines whether the designated oPCR is in the locked state. If the control unit 105 determines that the designated oPCR is in the locked state, the process advances to step S1106. On the other hand, if the control unit 105 determines that the designated oPCR is in the unlocked state, the process advances to step S1107.

In step S1106, the control unit 105 changes the current format of the designated oPCR into the format designated by the OUTPUT PLUG SIGNAL FORMAT control command. Also, the control unit 105 returns, to the controller, an "accepted" response indicating that the OUTPUT PLUG SIGNAL FORMAT control command has been properly accepted by the control unit 105. The process then advances to step S814.

In step S1107, the control unit 105 returns a "rejected" response to the controller. The "rejected" response is a response indicating that the OUTPUT PLUG SIGNAL FORMAT control command has been rejected by the control unit 105. The process then advances to step S814.

In this manner, according to the DVC 10 in the second embodiment, the current format of the designated oPCR can appropriately be set in accordance with a state of the designated oPCR and an operating state of the DVC 10. Particularly when an oPCR outputting stream data reproduced from the recording medium 40 is the designated oPCR and simultaneously the designated oPCR is set to the unlocked state, it is possible to reject the OUTPUT PLUG SIGNAL FORMAT control command.

Figure 10:
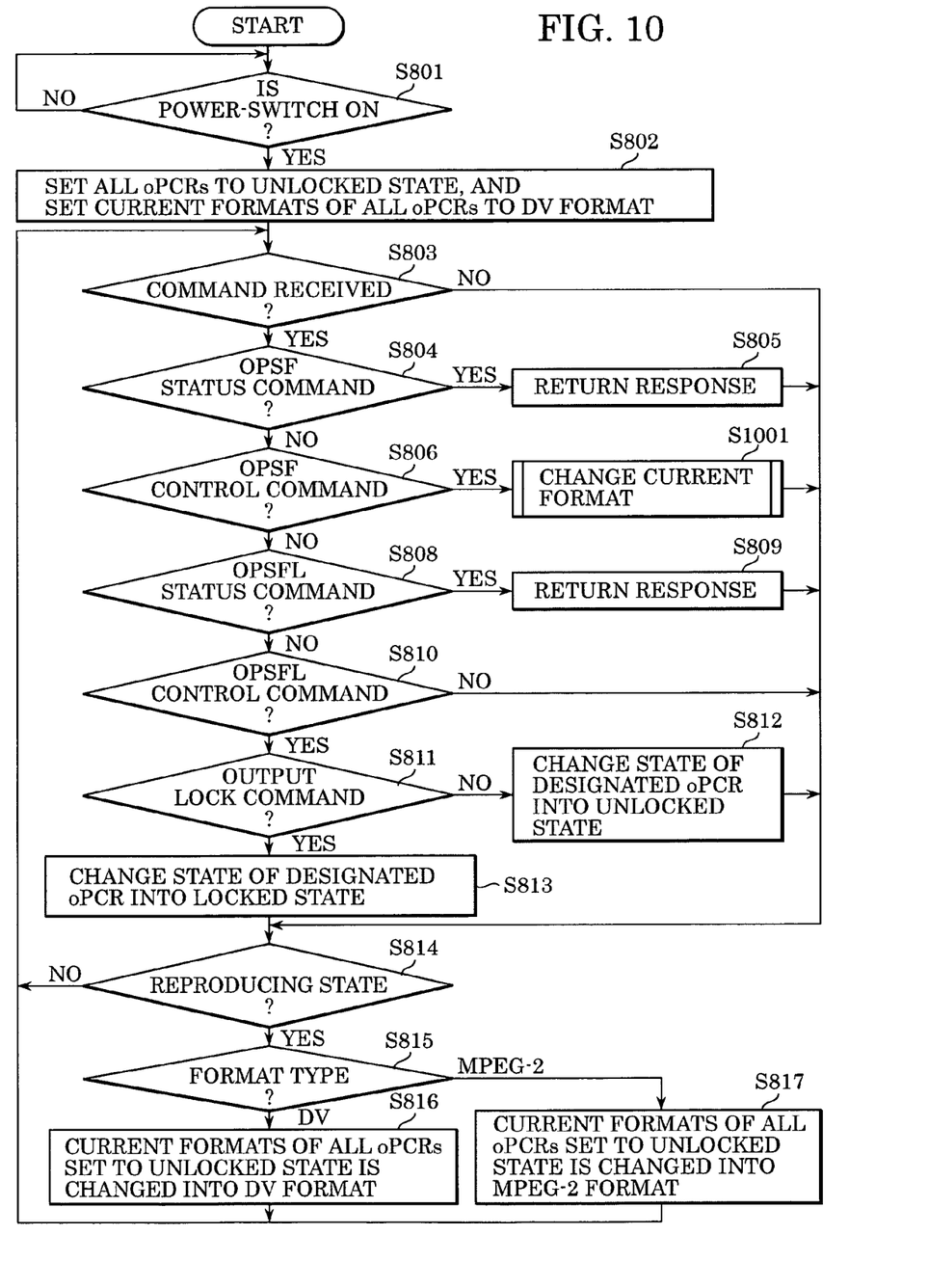
FIG. 10 is a flowchart showing processing performed in the recording and reproducing unit according to a second embodiment of the present invention.

In the processing shown in FIGS. 10 and 11, the oPCR can also be replaced with the iPCR. For this purpose, each of the OUTPUT PLUG SIGNAL FORMAT status command, OUTPUT PLUG SIGNAL FORMAT control command, OUTPUT PLUG SIGNAL FORMAT LOCK status command, and OUTPUT PLUG SIGNAL FORMAT LOCK control command, has only to be replaced with a respective one of the INPUT PLUG SIGNAL FORMAT status command, INPUT PLUG SIGNAL FORMAT control command, INPUT PLUG SIGNAL FORMAT LOCK status command, and INPUT PLUG SIGNAL FORMAT LOCK control command.

Third Embodiment

In the first and second embodiments, descriptions were made of the implementation examples in which the desired oPCR is set to the DV locked state or MPEG locked state before putting the DVC 10 into the reproducing state (PLAY state), and in which the desired oPCR is set to the unlocked state after having put the DVC 10 into the reproduction stop state (STOP state).

In contrast, in a third embodiment, descriptions are provided of an implementation example in which a desired oPCR is set to the locked state when a control program for remotely controlling the DVC 10 is started, and in which the desired oPCR is set to the unlocked state when the execution of the control program is completed. In the third embodiment, the same portions as those in the first and second embodiment are omitted from description, and only portions different from those in the first and second embodiments are described here.

Figure 12:
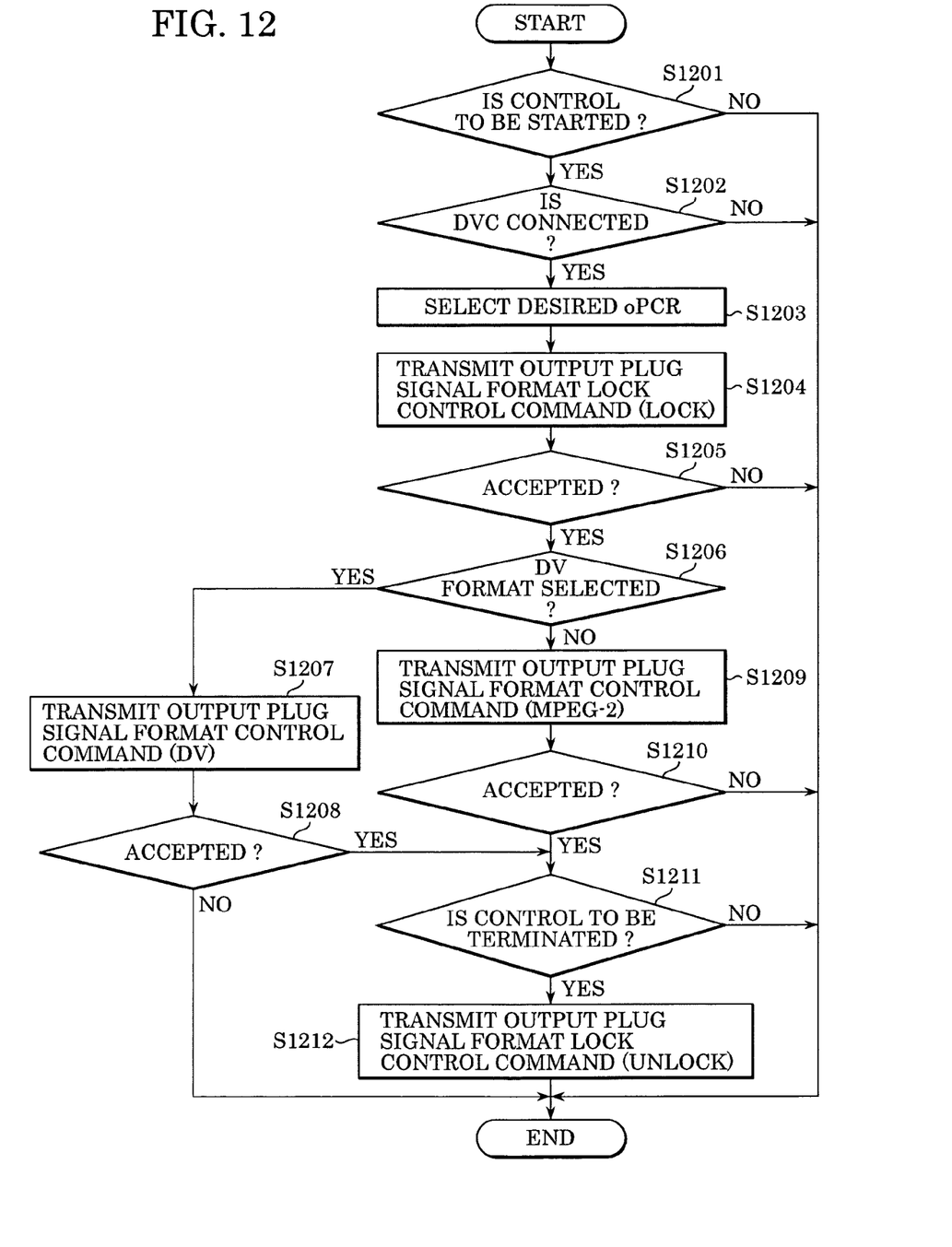
FIG. 12 is a flowchart showing processing performed in a control apparatus according to a third embodiment of the present invention.

FIG. 12 is a flowchart showing an example of processing to be executed in the controller (the PC 10 or DTV 50). This processing is one executed by the controller in accordance with a control program for remotely controlling the DVC 10.

In step S1201, the controller determines whether the execution of the above-described control program is to be started. If the controller determines that the execution of the control program is to be started, the process advances to step S1202. Otherwise, the process ends.

In step S1202, the controller determines whether the DVC 10 is connected to the IEEE 1394 serial bus 30. If so, the process advances to step S1203. Otherwise, the process ends.

In step S1203, the controller selects a desired oPCR. In FIG. 12, for the sake of simplicity, the case where an oPCR [0] (the oPCR of No. 0) is selected, is explained.

In step S1204, the controller produces the OUTPUT PLUG SIGNAL FORMAT LOCK control command (LOCK) that requires setting the oPCR [0] to the locked state, and transmits this command to the DVC 10. The OUTPUT PLUG SIGNAL FORMAT LOCK control command (LOCK) is transferred from the controller to the DVC 10 through the IEEE 1394 serial bus 30 in an asynchronous transfer mode. Upon receipt of the OUTPUT PLUG SIGNAL FORMAT LOCK control command (LOCK), the DVC 10 sets the oPCR [0] to the locked state.

In step S1205, the controller determines whether a response to the OUTPUT PLUG SIGNAL FORMAT LOCK control command (LOCK) is an "accepted" response. The DVC 10 having properly accepted the OUTPUT PLUG SIGNAL FORMAT LOCK control command (LOCK) transmits the "accepted" response to the controller. If the controller determines that it has received the "accepted" response from the DVC 10, the process advances to step S1206. Otherwise, the process ends.

In step S1206, the controller selects the DV format or MPEG-2 format. When executing the driver for DV format, the controller selects the DV format, and when executing the driver for MPEG-2 format, the controller selects the MPEG-2 format. When the DV format is selected, the process advances to step S1207, and when the MPEG-2 format is selected, the process advances to step S1209.

In step S1207, the controller produces the OUTPUT PLUG SIGNAL FORMAT control command (DV) that requires setting the current format of the oPCR [0] to the DV format, and transmits this command to the DVC 10. The OUTPUT PLUG SIGNAL FORMAT control command (DV) is transferred from the controller to the DVC 10 through the IEEE 1394 serial bus 30 in an asynchronous transfer mode.

In step S1208, the controller determines whether a response to the OUTPUT PLUG SIGNAL FORMAT control command (DV) is an "accepted" response. The DVC 10 having properly accepted the OUTPUT PLUG SIGNAL FORMAT control command (DV) transmits the "accepted" response to the controller. If the controller determines that it has received the "accepted" response from the DVC 10, the process advances to step S1211. Otherwise, the process ends.

In step S1209, the controller produces the OUTPUT PLUG SIGNAL FORMAT control command (MPEG-2) that requires setting the current format of the oPCR [0] to the MPEG-2 format, and transmits this command to the DVC 10. The OUTPUT PLUG SIGNAL FORMAT control command (MPEG-2) is transferred from the controller to the DVC 10 through the IEEE 1394 serial bus 30 in an asynchronous transfer mode.

In step S1210, the controller determines whether a response to the OUTPUT PLUG SIGNAL FORMAT control command (MPEG-2) is an "accepted" response. Once the DVC 10 has properly accepted the OUTPUT PLUG SIGNAL FORMAT control command (MPEG-2), it transmits the "accepted" response to the controller. If the controller determines that it has received the "accepted" response from the DVC 10, the process advances to step S1211. Otherwise, the process ends.

In step S1211, the controller determines whether the execution of the above-described control program is to be terminated. If the controller determines that the execution of the control program is to be terminated, the process advances to step S1212. Otherwise, the process ends.

In step S1212, the controller produces the OUTPUT PLUG SIGNAL FORMAT LOCK control command (UNLOCK) that requires setting the oPCR [0] to the unlocked state, and transmits this command to the DVC 10. The OUTPUT PLUG SIGNAL FORMAT LOCK control command (UNLOCK) is transferred from the controller to the DVC 10 through the IEEE 1394 serial bus 30 in an asynchronous transfer mode. Upon receipt of the OUTPUT PLUG SIGNAL FORMAT LOCK control command (UNLOCK), the DVC 10 sets the oPCR [0] to the unlocked state. The process then ends.

In this way, according to this embodiment, a desired oPCR can automatically be set to the DV locked state or MPEG locked state when a control program for remotely controlling the DVC 10 is started, and the desired oPCR can automatically be set to the unlocked state when the control program for remotely controlling the DVC 10 is completed, thus providing convenience to the user.

To the processing shown in FIG. 12, processing for transmitting an OUTPUT PLUG SIGNAL FORMAT status command to the DVC 10 can also be added before transmitting the OUTPUT PLUG SIGNAL FORMAT control command to the DVC 10. The OUTPUT PLUG SIGNAL FORMAT status command is a command for inquiring the current format of an oPCR defined by this command. When this processing is added, the controller (the PC 20 or DTV 50) can know the current format of a desired oPCR in advance. Furthermore, when the current format of the desired oPCR and the format defined by the OUTPUT PLUG SIGNAL FORMAT control command conform to each other, the controller can prevent the OUTPUT PLUG SIGNAL FORMAT control command from being transmitted to the DVC 10.

In the processing shown in FIG. 12, the oPCR can also be replaced with the iPCR. For this purpose, each of the OUTPUT PLUG SIGNAL FORMAT status command, OUTPUT PLUG SIGNAL FORMAT control command, OUTPUT PLUG SIGNAL FORMAT LOCK status command, and OUTPUT PLUG SIGNAL FORMAT LOCK control command, has only to be replaced with a respective one of the INPUT PLUG SIGNAL FORMAT status command, INPUT PLUG SIGNAL FORMAT control command, INPUT PLUG SIGNAL FORMAT LOCK status command, and INPUT PLUG SIGNAL FORMAT LOCK control command.

Fourth Embodiment

To step S807 in FIG. 8 and STEP S1001 in FIG. 10, the following four processing can also be added: a first processing for reading out, from the plug management table, a node ID that has set the oPCR designated by an OUTPUT PLUG SIGNAL FORMAT control command, to the locked state; a second processing for determining whether the node ID read out from the plug management table and the node ID of the controller that has transmitted the OUTPUT PLUG SIGNAL FORMAT control command conform to each other; a third processing for transmitting a "rejected" response to the controller instead of changing the current format of the oPCR when the above-described two node IDs do not conform to each other; and a fourth processing for changing the current format of the oPCR and transmitting an "accepted" response to the controller when the two node IDs conform to each other. In this case, an OUTPUT PLUG SIGNAL FORMAT control command from the controller type other than the controller type that has set an oPCR to the locked state can be rejected, so that it is possible to prevent the current format of the oPCR from being undesirably changed by the controller type other than the controller type that has set the oPCR to the locked state. This enables, after the oPCR has been set to the locked state, the controller type that has set the oPCR to the locked state to exclusively change the current format of the oPCR. Regarding these features, the same goes for the control of iPCRs.

Fifth Embodiment

A system or apparatus with a recording medium that has recorded thereon computer program that implements the functions of the above-described embodiments may be supplied. A computer (or CPU or MPU (micro-processing unit)) for the system or apparatus reads out and executes the computer program stored in the recording medium.

In this case, the computer program read out from the recording medium realizes the functions of the above-described embodiments.

The recording media for supplying the computer program may include, but is not limited to, a flexible disk, hard disk, optical disk, magneto-optical disk, CD-ROM (compact disk-read-only memory), CD-R (CD-recordable), magnetic tape, nonvolatile memory card, ROM, etc.

The present invention incorporates not only a case where the functions of the above-described embodiments are implemented by executing the computer program read out by the computer, but also a case where, based on the instructions of the computer program, an OS (basic system or operating system) or the like running on the computer executes part or all of the actual processing, thus implementing the functions of the above-described embodiments through the processing.

The present invention also incorporates a case where the computer program read out from the recording medium is written into a memory provided in a function expansion unit connected to a function expansion board or the computer, and thereafter, based on the instructions of the computer program, a CPU or the like provided in the function expansion board or the function expansion unit executes part or all of the actual processing, thus achieving the functions of the above-described embodiments through the processing.

Other Embodiments

The present invention is not restricted to the above-described embodiments, but can be applied to various embodiments.

For example, although the above-described embodiments are ones using a transmission medium conformable to the IEEE 1394 standards, the present invention can also be applied to embodiments employing a transmission medium conformable to the USB standard or the like.

Also, the above-described embodiments are ones using oPCRs and iPCRs defined by the IEC 61883-1, but the present invention can also be applied to embodiments using output means corresponding to oPCRs, i.e., output means including not only logical output terminals such as oPCRs but also physical output terminals, and input means corresponding to iPCRs, i.e., input means including not only logical output terminals such as iPCRs but also physical input terminals.

Furthermore, the above-described embodiments are ones using the DV format and MPEG-2 format, but the present invention can also be applied to embodiments using data formats other than the DV format, as well as data formats other than the MPEG-2 format. For example, the present invention can also be applied to embodiments employing an MPEG-4 format or motion JPEG format instead of the MPEG-2 format.

In the description of the above-described embodiments, embodiments using the two data formats were taken as examples, but the present invention can also be applied to embodiments using three data formats or more. For example, the present invention can also be applied to embodiments using the DV format, MPEG-2 format, and MPEG-4 system (or motion JPEG system).

The above-described embodiments are merely exemplary of the present invention, and are not to be construed to limit the scope of the present invention. The scope of the present invention is defined by the scope of the appended claims, and is not limited to only the specific descriptions in this specification. Furthermore, all modifications and changes belonging to equivalents of the claims are considered to fall within the scope of the present invention.

This application claims priority from Japanese Patent Application No. 2004-052938 filed Feb. 27, 2004, which is hereby incorporated by reference herein.

What is claimed is:

1. A data output apparatus comprising:
    a reproducing unit adapted to reproduce data from a recording medium;
    an output terminal adapted to output the data reproduced from the recording medium; and
    a control unit adapted to control the output terminal,
    wherein the control unit sets the output terminal to a state locked to one data format if the data output apparatus receives a first command from an external device,
    wherein the control unit sets the output terminal to a state not locked to one data format if the data output apparatus receives a second command from the external device,
    wherein the control unit changes a current data format of the output terminal into a data format designated by a third command irrespective of whether the output terminal is being locked to one data format, if the data output apparatus receives the third command from the external device,
    wherein the control unit changes the current data format of the output terminal into the data format of the data being reproduced from the recording medium, if the output terminal is not being locked to one data format, and
    wherein the control unit controls the data reproduced from the recording medium not to be outputted from the output terminal, if a data format of the data reproduced from the recording medium is not conformed to the current data format of the output terminal after the control unit changes the current data format of the output terminal into the data format designated by the third command.

2. The data output apparatus according to claim 1, wherein the output terminal is an output plug control register (oPCR).

3. The data output apparatus according to claim 1, wherein the data output apparatus is one of a digital video camera, a digital camera, a mobile phone with camera, and a digital video recorder.

4. A method of controlling a data output apparatus, the data output apparatus including a reproducing unit adapted to reproduce data from a recording medium, an output terminal adapted to output the data reproduced from the recording medium, and a control unit adapted to control the output terminal, the method comprising:
    setting the output terminal to a state locked to one data format if the data output apparatus receives a first command from an external device;
    setting the output terminal to a state not locked to one data format if the data output apparatus receives a second command from the external device;
    changing a current data format of the output terminal into a data format designated by a third command irrespective of whether the output terminal is being locked to one data format, if the data output apparatus receives the third command from the external device;
    changing the current data format of the output terminal into the data format of the data being reproduced from the recording medium, if the output terminal is not being locked to one data format; and
    controlling the data reproduced from the recording medium not to be outputted from the output terminal, if a data format of the data reproduced from the recording medium is not conformed to the current data format of the output terminal after the current data format of the output terminal is changed into the data format designated by the third command.

5. The method according to claim 4, wherein the output terminal is an output plug control register (oPCR).

6. The method according to claim 4, wherein the data output apparatus is one of a digital video camera, a digital camera, a mobile phone with camera, and a digital video recorder.

* * * * *